Sept. 23, 1924.
C. J. FELGER
STRAINER HOLDER
Filed April 17, 1922
1,509,593
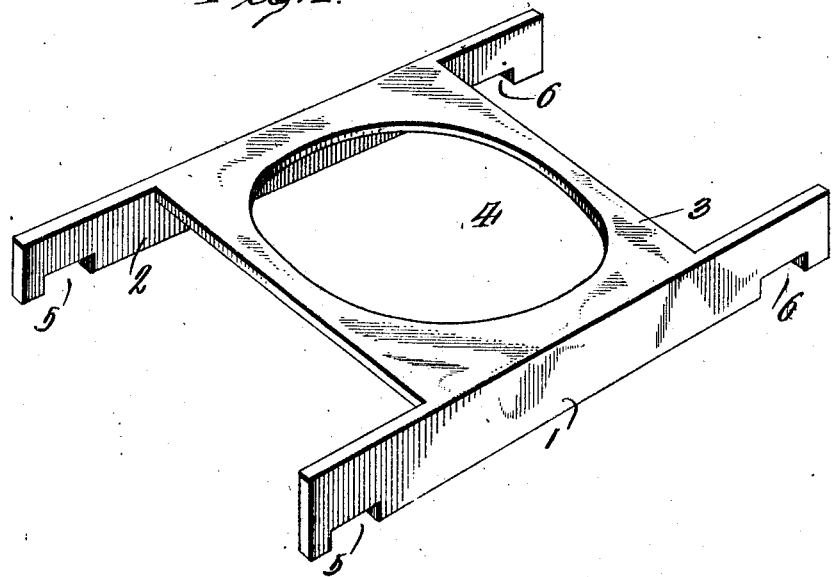
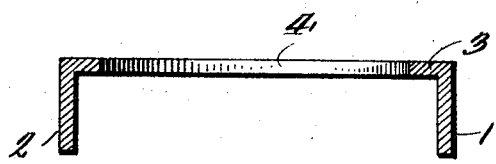
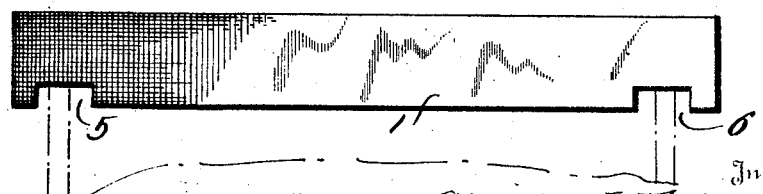

Patented Sept. 23, 1924.

1,509,593

UNITED STATES PATENT OFFICE.

CHARLES J. FELGER, OF CHURUBUSCO, INDIANA.

STRAINER HOLDER.

Application filed April 17, 1922. Serial No. 553,771.

*To all whom it may concern:*

Be it known that I, CHARLES J. FELGER, a citizen of the United States, residing at Churubusco, in the county of Whitley and State of Indiana, have invented certain new and useful Improvements in a Strainer Holder, of which the following is a specification.

This invention relates to a strainer holder and has for its primary object the production of a strainer holder which is adapted to be used in connection with a cream separator, and the strainer holder rests on the top of the separator supply tank, thereby obviating the necessity of a person having to hold the strainer thereon.

Another object of the invention is to provide a strainer holder which can be easily attached or placed upon a cream separator tank and support the strainer element thereon so as to prevent the contents being strained into the tank from splashing.

Another object of the invention is to provide a device of the character described which will possess many improvements over other strainer holders now known and which by reason of its peculiar construction will be adapted to general uses as well as to cream separator.

Another important object of the invention resides in a strainer holder of the class above set forth wherein the parts are extremely simple in construction, easily assembled, highly efficient in operation, practical and otherwise capable of being manufactured at a low cost whereby its commercial possibilities are greatly enhanced.

Other objects and advantages of this invention will become apparent during the course of the following description.

In the drawings:—

Figure 1 is a perspective view of the strainer holder,

Figure 2 is a section taken through the central portion of the strainer holder, and Figure 3 is a side view of the strainer holder shown applied to the top edge of a cream separator tank.

In the drawings wherein for the purpose of illustration is shown a preferred embodiment of my invention, the numerals 1 and 2 designate a pair of supporting members which are spacedly depending from the screen holder 3. The supporting members 1 and 2 are so formed in connection with the strainer holder 3 so as to normally extend beyond the sides or ends of the strainer holder 3 for a purpose hereinafter to be described.

The strainer holder is provided with the usual opening 4 for the purpose of receiving the straining element which may be of any desired material for the purpose of allowing the strained milk or cream to easily flow into the tank upon which the strainer holder is supported.

As above stated, the supporting members 1 and 2 extend beyond the sides of ends of the screen support or holder 3 and by reference to Fig. 1 of the drawing it will be seen that the extending portions of the supporting members 1 and 2 are provided with notches 5 and 6 respectively at the lower edge of the supporting members 1 and 2 and adjacent the edges thereof. These notches 5 and 6 are formed on each side or at each end of the supporting members and the purpose is to allow means whereby the strainer holder may easily be held and supported upon the cream separator tank so as to enable the operator to easily place the same thereon and does not necessitate holding of the screen support over the tank by another person. This may be seen in Fig. 3 wherein the supporting member is shown supported on a cream separator tank.

In use, the strainer holder is placed upon a cream separator tank wherein it is desired to have the contents strained so that the notches 5 and 6 rest upon the top edge of the cream separator tank and the straining medium is then placed over the opening 4 of the strainer holder 3 and further enables the holding of the straining medium in position, the same can be taken by the edges thereof if the straining medium is of cloth and drawn over the sides of the strainer holder 3 and under the notches of the supporting members, and then it will be clamped by the sides of the separator tank so as to firmly hold the same in position.

If this is not used, then an ordinary filter screen may be easily placed upon the top of the strainer holder 3 and the milk or cream then poured through the straining element into the separator tank.

The strainer holder and the supporting members may be made of one piece of metal and bent into position as shown in Fig. 1 so as to provide the top portion of the strainer holder 3 flush with the top edges of the supporting members 1 and 2. In this manner, a perfectly smooth and flat surface is provided and there is no possibility of any cracks being formed or crevices being made in the top edge or surface of the strainer holder and thereby make the same useless.

It is to be understood that the form of my invention herewith shown and described is to be taken as the preferred embodiment of the same, and various changes in the shape, size and arrangement of parts may be resorted to without departing from the spirit of the invention and the scope of the appended claim.

Having thus described my invention, what I claim is:—

A strainer holder for the bowls of cream separators comprising a pair of spaced parallel disposed side supporting bars, a flat rectangular shaped body plate connected to and arranged between the side bars, and having an enlarged axial opening therein for the straining material, the flat side supporting bars depending from the side edges of the plate, the terminals of the bars extending beyond the ends of the plate and having their lower faces provided with notches for receiving the cream separator bowl, whereby shifting movement of the holder in relation to the bowl will be prevented.

In testimony whereof I affix my signature in presence of two witnesses.

CHARLES J. FEIGER.

Witnesses:
ILA M. KICHLER,
GEORGE W. KICHLER.